Inventor
W. Hryniszak

United States Patent Office 3,103,100
Patented Sept. 10, 1963

3,103,100
GAS TURBINE PLANTS
Waldemar Hryniszak, Newcastle-upon-Tyne, England, assignor to C. A. Parsons & Company Limited, Newcastle-upon-Tyne, England
Filed Oct. 10, 1957, Ser. No. 689,351
Claims priority, application Great Britain Oct. 11, 1956
1 Claim. (Cl. 60—13)

This invention relates to gas turbine plants the working medium of which is supplied by free piston gas generators.

It is known to arrange a combustion chamber between a free piston gas generator and a gas turbine so as to raise the inlet temperature of the turbine and hence its output.

One method of putting this into effect is to insert the combustion chamber between the generator and turbine so that all the air produced by the compressor portion of the generator passes first through the engine portion for scavenging, cooling and recharging purposes and then passes to the combustion chamber.

From a combustion efficiency point of view, it has been suggested that the main portion of the air produced by the compressor portion of the generator should by-pass the engine portion and be lead directly to the combustion chamber, the amount of air being led to the combustion chamber via the engine portion being sufficient only for scavenging, cooling and the like purposes and it is with this arrangement that the present invention deals.

There are both advantages and disadvantages in arranging a combustion chamber between a free-piston gas generator and a gas turbine. One advantage is that the output of the gas turbine can be greatly increased by means of a simple and light combustion chamber without increasing the dimensions of the gas generator. The generator may, for instance, deal with average load conditions, whereas the combustion chamber deals mainly with the maximum load conditions which occur only occasionally such for instance as in a power unit for tractive purposes. Another advantage is the possibility of closely co-relating the function of gas generator and gas turbine as regards gas volumes to be handled.

Without a combustion chamber, and at about one-quarter load, the amount, temperature and pressure of the gas delivered by the gas generator are not compatible with the requirements of the gas turbine, with the result that there is a sharp increase in specific fuel consumption due to the necessity for blowing-off, and like requirements. To overcome this drawback, it has been proposed to use a turbine with pivoted nozzles so as to enable the inlet area to be adjusted to suit the flow of gas from the gas generator. It is difficult to make such nozzles, which have to work at elevated temperatures, in such a way as to maintain their efficiency and reliability in service.

The disadvantages of using a combustion chamber between gas generator and gas turbine is that the specific fuel consumption is increased.

The object of the present invention is to provide a gas turbine plant the working medium for which is supplied by a free piston gas generator in which the main portion of the air produced by the compressor portion of the generator by-passes the engine portion and is led directly to the combustion chamber but free from the disadvantages referred to above.

The invention consists in a gas turbine plant including an air compressor in which a part only of the air from the compressor passes through a heat exchanger.

The invention also consists in a gas turbine plant comprising a free piston gas generator and a turbine or turbines receiving gas from the generator, in which plant a portion of the air produced by the compressor portion of the generator by-passes the engine portion of the generator and is conveyed to a combustion chamber via a heat exchanger, said air being heated in the heat exchanger by exhaust gases from the turbine or turbines, the remaining portion of the air being led through the engine portion and thence to a reservoir before being conveyed to the combustion chamber, the combustion products from said chamber being subsequently expanded in the turbine or turbines.

The invention also consists in a gas turbine plant in accordance with the preceding paragraph in which the air led to the engine portion is first cooled.

The invention also consists in gas turbine plants substantially as described below with reference to the accompanying diagrammatic drawings, in which.

Figure 1:
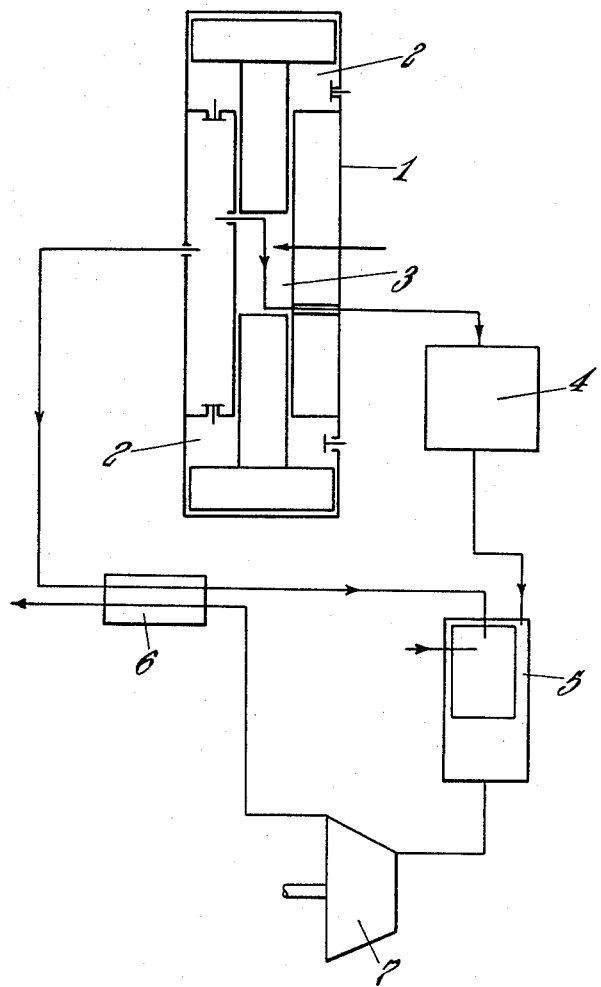
FIGURE 1 shows a typical gas turbine plant in accordance with one form of the present invention.

In carrying the invention into effect in the forms illustrated by way of example and referring first to FIGURE 1 a gas turbine plant comprises a free piston generator 1 having a compressor portion 2 and an engine portion 3, a receiver 4, a combustion chamber 5, a heat exchanger 6 and a turbine 7, all co-related as indicated in the accompanying diagrammatic drawing. Air from the compressor portion of the gas generator is split into two streams, one stream, being of a quantity which is sufficient only for scavenging, cooling and recharging of the engine portion of the generator, is conducted through the said engine portion 3 before entering the aforementioned receiver 4 giving, for instance, the possibility of cooling the compressed air leaving the compressor before it enters the engine portion 3 to act amongst other things as a scavenger. From the receiver it is led to the combustion chamber 5.

The other stream of air from the compressor portion 2 of the gas generator is led directly to a heat exchanger 6 before entering the combustion chamber 5.

The products of combustion are led to the turbine 7 the exhaust gases from which are led through the heat exchanger and give up their heat content to the air passing directly from the gas generator to the combustion chamber. Fuel is supplied to the engine portion of the gas generator and to the combustion chamber. The air from the engine portion 3 is used as secondary air in the combustion chamber mixing with the primary air from the heat exchanger 6.

By the arrangement described the efficiency of the power unit can not only be maintained but even increased to suit prevailing conditions. Like the optimum conditions prevailing in a conventional gas turbine unit, there are likewise optimum conditions as regards the best super-charging pressure in the engine portion of the gas generator, these conditinos being governed by the thermal ratio on the air side of the exchanger as well as by the amount of air to be preheated compared with the amount of gas available for this purpose.

The air used for scavenging can be cooled before it enters the engine portion 3 if desired.

Figure 2:
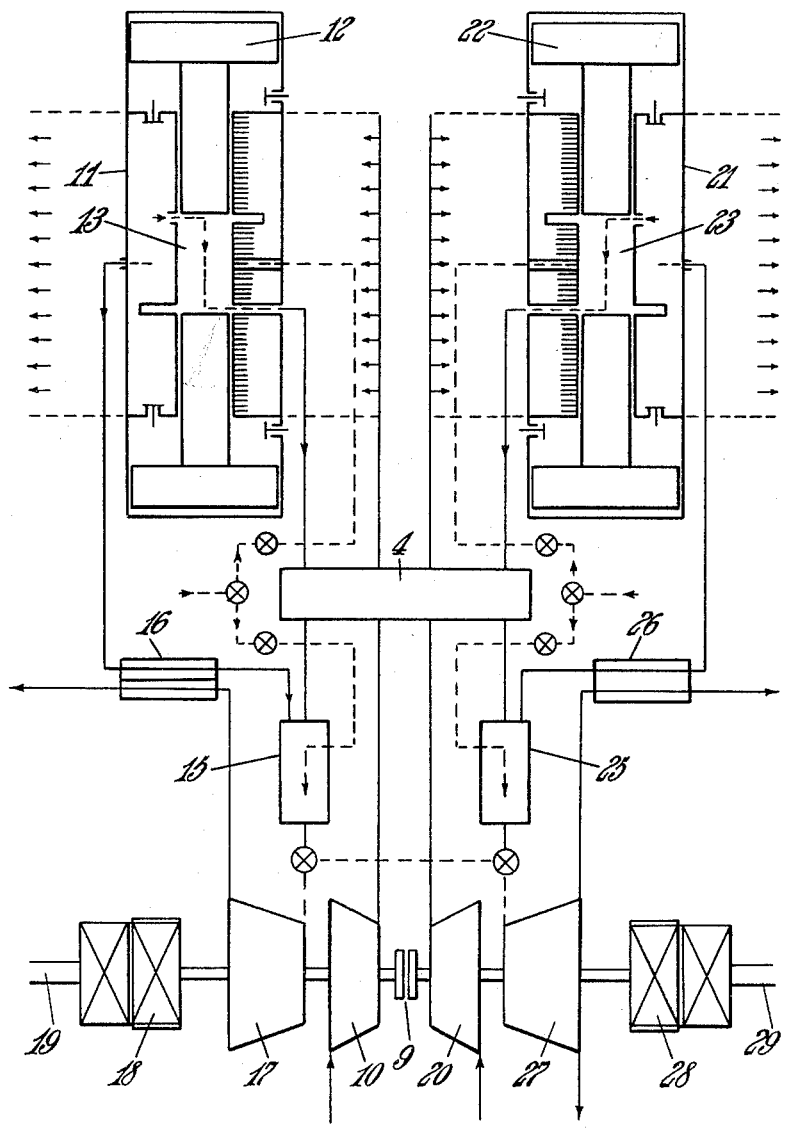
FIGURE 2 shows a gas turbine plant incorporating one form of the present invention and suitable for vehicle propulsion.

In a gas turbine plant for traction purposes two free piston gas generators may be used as shown in FIGURE 2. In this figure in comparison with FIGURE 1 two free piston generators 11 and 21 are used in place of the single free piston generator 1, corresponding compressor portions being 12 and 22 and engine portions 13 and 23, the air used for scavenging purposes in their respective engine portions being conducted to a common receiver 4. Combustion chamber 15 and turbine 17 are associated with generator 1 while combustion chamber 25 and turbine 27 are associated with generator 21. Each turbine, 17 or 27, independently of the other can drive one wheel of a vehicle through a gear system 18 or 28 respectively.

The output required for each turbine can be controlled by valves situated between the combustion chamber and turbine while suitable arrangements may be provided for controlling the amount of fuel burnt in the gas generators 11 and 21 and combustion chambers 15 and 25.

If desired, a clutch 9 may be provided between the two turbine shafts 19 and 29 to give a mechanical connection between them when required.

The free piston generators may be cooled as a whole as shown diagrammatically in FIGURE 2 by mounting fans 10 and 20 on the turbine shafts, which fans blow air over the surface of the generators which may have fins as indicated diagrammatically thus providing the desired cooling.

I claim:

A gas turbine plane comprising a free piston gas generator including a compression portion and engine portion and a turbine receiving gas from the generator, means including a heat exchanger for by-passing the major portion of the air produced by the compressor portion of the generator around the engine portion of the generator and conveying the said by-passed portion to a combustion chamber via the heat exchanger, the said heat exchanger comprising means for heating the said air by exhaust gases from the turbine, and means for leading the remaining portion of the air through the engine portion and comprising a reservoir receiving air and combustion products from the said engine portion before these are conveyed to the combustion chamber, the combustion products from said chamber being substantially expanded in the turbine.

References Cited in the file of this patent

UNITED STATES PATENTS

| | | |
|---|---|---|
| 2,745,246 | Huber | May 15, 1956 |
| 2,807,135 | Addie | Sept. 24, 1957 |

FOREIGN PATENTS

| | | |
|---|---|---|
| 1,094,386 | France | Dec. 8, 1954 |
| 502,758 | Great Britain | Mar. 24, 1939 |
| 595,627 | Great Britain | Dec. 11, 1947 |
| 737,082 | Great Britain | Sept. 21, 1955 |